United States Patent
Schmidt et al.

(10) Patent No.: US 9,460,053 B2
(45) Date of Patent: *Oct. 4, 2016

(54) DEPTH-FIRST SEARCH FOR TARGET VALUE PROBLEMS

(75) Inventors: Tim Schmidt, Palo Alto, CA (US); Rong Zhou, Cupertino, CA (US); Lukas D. Kuhn, Palo Alto, CA (US); Robert Price, Palo Alto, CA (US); Johan de Kleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1160 days.

This patent is subject to a terminal disclaimer.

(21) Appl. No.: 13/483,184

(22) Filed: May 30, 2012

(65) Prior Publication Data

US 2012/0246193 A1    Sep. 27, 2012

Related U.S. Application Data

(62) Division of application No. 12/497,326, filed on Jul. 2, 2009, now Pat. No. 8,364,629.

(51) Int. Cl.
*G06F 17/11*    (2006.01)

(52) U.S. Cl.
CPC ..................................... *G06F 17/11* (2013.01)

(58) Field of Classification Search
None
See application file for complete search history.

(56) References Cited

U.S. PATENT DOCUMENTS

| | | | |
|---|---|---|---|
| 2005/0209841 A1* | 9/2005 | Arning | G06F 11/1402 703/22 |
| 2010/0010654 A1 | 1/2010 | DeKleer et al. | |
| 2010/0010845 A1 | 1/2010 | Kuhn et al. | |
| 2010/0010952 A1 | 1/2010 | Kuhn et al. | |
| 2010/0241251 A1 | 9/2010 | Kuhn et al. | |
| 2011/0004581 A1 | 1/2011 | Schmidt et al. | |
| 2011/0004625 A1 | 1/2011 | Schmidt et al. | |

OTHER PUBLICATIONS

King et al, "Lazy Depth-First Search and Linear Graph Algorithms in Haskell", GLA (1994).*
Bonet et al, "Learning Depth-First Search: A Unified Approach to Heuristic Search in Deterministic and Non-Deterministic Settings, and its application to MDPs", Proceedings of the International Conference on Automated Planning and Scheduling (ICAPS). pp. 142-151, Cumbria, UK (2006).*

(Continued)

*Primary Examiner* — Stanley K Hill
*Assistant Examiner* — Ilya Traktovenko
(74) *Attorney, Agent, or Firm* — Fay Sharpe LLP

(57) ABSTRACT

A model-based control system for controlling a production system is disclosed. The production system provides jobs and objectives to the model-based control system. The model-based control system includes, a planner operative to provide the production system with a plan, the planner generating the plan using a depth-first target value search. The depth-first target value search being configured to generate the plan with a failure probability most closely approximating a target value. Also provided is a system model operative to model the behavior of the production system. Another aspect of the model-based control system is a diagnosis engine operative to estimate failure probabilities for plans and provide diagnostic guidance to the planner. The model-based control system including the planner, the system model and diagnosis engine are implemented via a digital processing device.

17 Claims, 14 Drawing Sheets

(56) References Cited

OTHER PUBLICATIONS

Hart et al, "A Formal Basis for the Heuristic Determination of Minimum Cost Paths", IEEE Transactions of Systems Science and Cybernetics, vol. SSC-4, No. 2, Jul. 1968.*
Kuhn et al, "Pervasive Diagnosis: The Integration of Diagnostic Goals into Production Plans", Proceedings of the Twenty-Third AAAI Conference on Artificial Intelligence (2008).*
Liu, "A Unified Information Criterion for Evaluating Probe and Test Selection", 2008 IEEE International Conference on Prognostics and Health Management, teaches diagnostics.*
Rina Dechter, "Generalized Best-First Search Strategies and the Optimality of A*",Journal of the Association for Computing Machinery, vol. 32, No. 3, Jul. 1985, pp. 505-536.*
Sibeyn et al, "Heuristics for Semi-External Depth First Search on Directed Graphs", SPAA'02, Aug. 10-13, 2002, Winnipeg, Manitoba, Canada.*
Tarjan, "Depth-First Search and Linear Graph Algorithms", Siam J. Comput., vol. 1, No. 2, Jun. 1972.*
Zhou et al, "Breadth-first heuristic search", Elsevier, Artificial Intelligence 170 (2006) 385-408.*
Kuhn et al., "Heuristic Search for Target-Value Path Problem", First International Symposium on Search Techniques in Artificial Intelligence and Robotics, Jul. 13-14, 2008 (available at http://www.aaai.org/Papers/Workshops/2008/WS-08-10-012.pdf).
Culberson et al., "Searching With Pattern databases", Lecture Notes in Computer Science, 1081:401-416, 1996.
Dechter et al., "Generalized Best-First Search Strategies and the Optimality of A*", Journal of the ACM (JACM) 32 (3):505-536, 1985.
Dow, et al., "Best-First Search for Treewidth", American Association for Artificial Intelligence, 2007, 6 pgs.
Hart et al., "A Formal Basis for the Heuristic Determination of Minimum Cost Paths", Systems Science and Cybernetics, IEEE Transactions on 4(2):100-107, 1968.
Holte, et al., "A Space-Time Tradeoff for Memory-Based Heuristics", American Association for Artificial Intelligence, 1999, 6 pgs.
Kuhn et al., "Pervasive Diagnosis: The Integration of Active Diagnosis Into Production Plans", Association for the Advancement of Artificial Intelligence, 2008, pp. 1306-1312.
Liu et al., "A Unified Information Criterion for Evaluating Probe and Test Selection", International Conference on Prognostics for Evaluating Probe and Test Selection, 2008, pp. 1-8.
King et al., "Lazy Depth-First Search and Linear Graph Algorithms in Haskell", GLA (1994).
Bonet et al., "Learning Depth-First Search: A Unified Approach to Heuristic Search in Deterministic and Non-Deterministic Settings, and its application to MDPs", Proceedings of the International Conference on Automated Planning and Scheduling (ICAPS), pp. 142-151, Cumbria, UK (2006).
Sibeyn et al., "Heuristics for Semi-External Depth First Search on Directed Graphs", SPaA '02, Aug. 10-13, 2002, Winnipeg, Manitoba, Canada.

* cited by examiner

DEPTH-FIRST SEARCH FOR TARGET VALUE PROBLEMS

This application claims the priority, as a divisional, of U.S. application Ser. No. 12/497,326 for Depth-First Search For Target Value Problems by Schmidt et al., filed Jul. 2, 2009 (now U.S. Publication No. 2011-0004581-A1), the disclosure of which is incorporated herein by reference in its entirety.

BACKGROUND

The present exemplary embodiments relate to systems and methods for target value searching that can be used in a variety of settings such as online diagnosis for production planning systems and systems for providing consumers with targeted search results. Automated production planning systems may require selection of plant resources to produce a given product while intelligently employing certain production resources to obtain diagnostic information indicating the probability of particular resources being faulty. In this situation, the diagnostic goals of the planner may not be facilitated by simply selecting the shortest or fastest set of resources to build the product, but instead selecting a plan defining a sequence of resources that build the product while testing fault probabilities that are non-zero. In another example, consumers may desire a planner to identify vacation plans to a certain destination (or multiple prospective destinations) that have a certain duration (or range of durations, such as 5-7 days with start and end dates in a specified month) and that have a given target cost or cost range. Mapping systems may be required in a further application that can receive starting and ending locations, as well as a target distance and/or time values for planning a drive for viewing autumn leaves where the consumer wants a trip plan that lasts for 3-5 hours during daylight through parks in the month of October.

In the past, search problems were solved using minimization algorithms to find the shortest path or paths between a starting state and a goal state. However, the goal in certain applications is not necessarily to find paths with minimum length or cost, but instead the desired path has a non-zero or non-minimal cost or duration. Using shortest-path searching techniques in these situations involves identifying the shortest paths, and eliminating or exonerating those identified paths that do not fall within a target value range. The process would then be repeated until paths are identified that are within the desired range. This approach is impractical in most real-life applications, whereby a need exists for efficient target value path searching techniques and systems for use in identifying one or more paths having a value closest to a given target value.

INCORPORATION BY REFERENCE

The disclosures of U.S. patent application Ser. No. 12/497,353 for "Multi-interval heuristics for accelerating target-value search," by Schmidt et al., filed Jul. 2, 2009 (now U.S. Publication No. 2011-0004625-A1, published Jan. 6, 2011); and U.S. patent application Ser. No. 12/409,235 for "Heuristic Search for Target-Value Path Problem," by Kuhn et al., filed Mar. 23, 2009 (now U.S. Publication No. 2010-0010952-A1, published Jan. 14, 2010), are each hereby incorporated herein in their entireties.

BRIEF DESCRIPTION

In accordance with one aspect of the present invention, a method for generating a pattern database for a model-based control system is provided. The model-based control system includes a directed acyclic graph. The directed acyclic graph includes a plurality of vertices interconnected by a plurality of edges. The method includes the step of selecting one or more vertices which are ready for processing from the plurality of vertices. The method selects the one or more vertices in an inverse topological order. The method further includes the steps of processing the selected one or more vertices and repeating the preceding steps until each of the plurality of vertices is processed. Processing includes assigning a range bound to each of the selected one or more of the plurality of vertices In accordance with another aspect of the present invention, a method for determining a target path for a model-based control system is provided. The model-based control system includes a directed acyclic graph. The directed acyclic graph includes a plurality of vertices interconnected by a plurality of edges. The method includes the step of performing a depth-first search of the directed acyclic graph for the target path. The depth-first search is operative to return an explicit solution or an implicit solution. The implicit solution is determined using a heuristic. The method further includes determining if the depth-first search returned an explicit solution or an implicit solution, and if the depth-first search returned an implicit solution, constructing the target path from the implicit solution.

In accordance with another aspect of the present invention, a model-based control system for controlling a production system is provided. The production system provides jobs and objectives to the model-based control system. The production system includes a plant. The system includes a planner operative to provide the production system with a plan. The planner generates the plan using a depth-first target value search. The depth-first target value search generates the plan with a failure probability most closely approximating a target value. The system further includes a system model operative to model the behavior of the plant, and a diagnosis engine operative to estimate failure probabilities for plans and provide diagnostic guidance to the planner. The diagnosis engine estimates the failure probabilities using the system model and observations from the production system.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
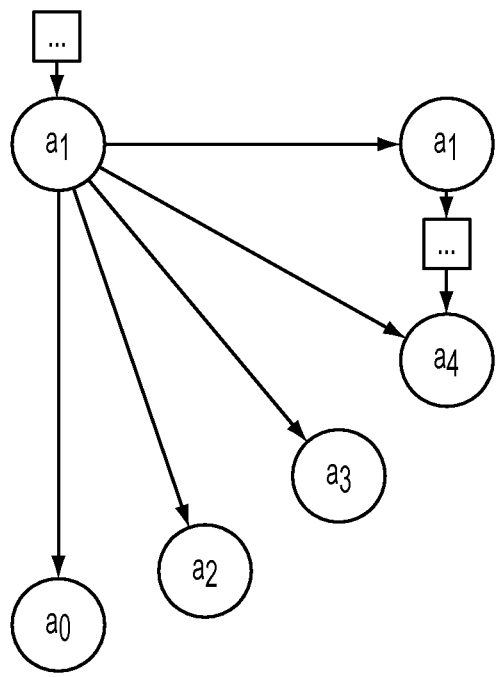
FIG. 1 is an illustration of a connection graph.

In a target value path problem, one is interested in finding a path between two nodes, or vertices, in a graph, whose sum of edge weights, or values, is as close as possible to some target-value. Such problems arise in a variety of domains, such as scheduling interdependent tasks for an employee's given working-hours, planning a bicycle trip with a given duration or determining an appropriate nightly-build process.

Given a directed acyclic graph $G=(V, E)$ with edge values, a target-value path between two vertices $v_o$, $v_g \in V$ with target-value tv is some path between $v_o$ and $v_g$, whose value is closest to tv. The value $g(p)$ of a path p is defined as the sum of its edge values. If $P_{v_o, v_g}$ is the set of all paths between $v_o$ and $v_g$, then $P_{v_o, v_g}^{tv} = \mathrm{armin}_{|tv-g(p)|} P_{v_o, v_g}$ is defined as the set of paths between $v_o$ and $v_g$ with minimal deviation from tv as the target-value path set with respect to $v_o$, $v_g$, tv. In the following, target-value search (or tvs for short) refers to a mapping of tuples $(v_0, v_g, tv)$ to some element of $P_{v_0, v_g}^{tv}$.

tvs was introduced in Kuhn et al., *Heuristic Search for Target-Value Path Problem*, First International Symposium on Search Techniques in Artificial Intelligence and Robotics (Jul. 13-14, 2008), available at http://www.aaai.orp/Papers/Workshops/2008/WS-08-10/WS08-10-012.pdf and is incorporated herein in its entirety. tvs is a challenging problem because generally it does not exhibit the properties of both overlapping subproblems and optimal substructure that would make it amenable to a dynamic programming approach (as is typically leveraged for shortest-path problems). In *Heuristic Search for Target-Value Path Problem*, Kuhn et al. showed that, in many cases, the problem can be decomposed, so that parts of it exhibit said properties. The idea is to pre-compute a pattern database pd that contains bounds of vertices' different path lengths to $v_g$. Given some prefix p (some path from $v_0$ to some vertex in G) and tv, the pd can be used to determine whether the optimal completion tv−g(p) falls outside the bounds stored in the pd. If so, the problem of finding an optimal completion for p breaks down to either a shortest-path or longest-path problem, both of which can be solved using dynamic programming (in DAGs).

First, in a dynamic programming sweep, each vertex in the Connection Graph of $v_o$ and $v_g$ (that is the subgraph of G comprising of only the vertices that are both $v_0$'s descendants and $v_g$'s ancestors, including $v_0$, $v_g$) is annotated with a set of ranges encompassing the values of the paths from this vertex to $v_{g8}$. That is to say, the implementation begins by generating a pd. The ranges of a vertex v represent progressive approximations of the lengths of paths from the vertex v to $v_g$ (i.e., all path lengths are guaranteed to be within the ranges). This pd can be reused for any tvs between $v_o$ and $v_g$.

Generation of the pd generally begins by initializing $pd(v_g)=[0; 0]$ and setting up a queue comprising of just $v_g$. In each step, a vertex is removed from the queue. Then for each in-edge e, the ranges are shifted by value (e) and propagated over e to the respective predecessor. Upon receiving the range set, the predecessor checks whether its range set covers the received ranges. If so, no further actions are necessary. Otherwise, it temporarily adds the new ranges to its range set and resolves any overlap between pairs by replacing it with the union of both ranges. If, at the end of this process, the size of the range set exceeds the allowed maximum, the two closest ranges are fused, until the size constraint is met. The process is repeated until a steady state is reached (i.e., when the queue is empty).

Figure 2:
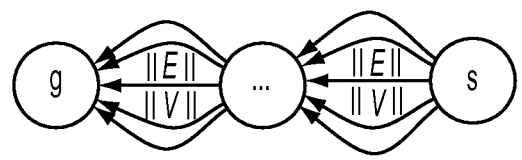
FIG. 2 is illustration of a connection graph with an exponential (in $\|V\|$) number of paths between s and g.

This process for building the pattern database is one of the two major culprits in preventing the scaling of tvs to large graphs. Consider the example in FIG. 1 under the following assumptions: $a_o$ is currently head of the queue, vertices are returned by the ancestor function in the order of their numbering and each update changes the pattern database entry of the respective vertex. First, $a_0$ is expanded, thereby updating $a_1$ and $a_2$ and placing them on the queue (in this order). Now $a_1$ is expanded, and all its predecessors (not shown in FIG. 1) are placed on the queue. Next is $a_2$. Here, $a_1$ gets updated and is thus placed on the queue, along with $a_3$. Now all the predecessor of $a_1$ are processed until $a_1$ is encountered again on the queue, resulting in its updated predecessors being added to the queue again. And so forth. In the worst case, each vertex is updated once for each distinct path between it and the goal vertex, resulting in exponential (in the number of vertices, see FIG. 2) worst-case running-time for constructing the pattern-database.

Notwithstanding how the pattern database pd is generated, a variant of A* is thereafter initiated from $v_o$, wherein a search node consists of a prefix (represented as a vertex and a pointer to its ancestor node) and its target-value to-go (from here on referred to as tv'), which is the original tv minus the prefix's value (g (M. Based on tv', and the pd entry for the prefix's last vertex, a minimum deviation for the best completion of that prefix can be computed, which is represented by the following heuristic:

heur(p)=min$_{r \in pd(p \cdot last)}$(dist(r,g(p)−tv'))

dist is defined as 0 if the scalar is within the range bounds; otherwise as min(|r·lb−tv'|,|r·ub−tv'|). The heur function has the following properties: it represents a lower bound on the value of the objective function for the best (and thus for all) possible completion of p in G; and, for all prefixes p' $\in P_{v_0, v_g}$, heur(p', tv')=dist([0; 0], tv')=|tv'|=|tv−g(p)| equals the objective function. This allows the use heur as the $f$ function in an A*.

The heuristic uses the pattern database by comparing a prefix's tv' against its last vertex's range set. Should tv' lie inside some range, there is a chance that an optimal completion of the prefix yields precisely the original tv. Thus, in order to be admissible, the heuristic has to rank such prefixes highest and return 0; otherwise, the heuristic returns tv' distance to the closest range. As all possible completion lengths lie within the ranges and each range's bounds represent actual path lengths, this is the closest any completion of said prefix can come to the original target value. So, in essence, the heuristic either gives perfect guidance (heur >0) or no guidance at all (heur=0). Intuitively, assuming tvs uniformly distributed over the range of the graph's path-lengths, the probability of the former case is inversely proportional to the "area" covered by the ranges. In a DAG, this area increases monotonically in the link-distance from the goal node, as each vertex's range-set covers at least as much ground as each of its successors.

To guarantee optimality, all prefixes in the heuristic's "blind-spot" (i.e., those ending in vertices where heur=0) have to be processed. In the worst case, this can be the largest part of graph. Furthermore the number of these prefixes can be exponential in the size of the blind-spot (recall FIG. 2). This is the second culprit that prevents best-first tvs from scaling to larger graph sizes. At some point the vast share of these prefixes will have to be kept in A*'s Open list, resulting in a worst-case memory requirement that is exponential in the number of vertices in C. This leaves the question of duplicate detection.

In the context of tvs there are two ways in which prefixes can be redundant. First, any pair of prefixes ending in the same vertex, with equal tv', will share the same optimal completion and have equal deviation from the original target-value. In other words, the respective best solutions stemming from said pair will be equal with regards to tvs's objective function and one of the prefixes can therefore be considered redundant and be discarded. This is tvs' analogue to duplicate detection. The second aspect is much more general: since heur has the property that for any prefix p, with heur(p, tv')>0, heur(p,tv') represents the actual deviation of p's best completion from the original tv. As such, for any pair of nodes $(p_1, tv'_1)$, $(p_2, tv'_2)$ with heur$(p_1, tv'_1) \geq$ heur $(p_2, tv'_2)>0$, $(p_1,tv'_1)$ can be considered redundant and consequently be ignored. The A* derivative makes use of this by pruning its Open list after the first entry with heur >0.

While it is well known, that A* is optimal in the number of node expansions for admissible heuristics (such as heur), duplicate detection can be expensive in terms of memory and computational overhead, as (in the worst case) all previously visited nodes have to be retained. This is especially so for domains in which duplicates occur rarely, such as tvs, where (due to their definition) duplicates are much rarer compared to shortest-path searches on the same graph (visiting the same vertex through paths of equal length versus just visiting the same vertex).

To avoid this overhead and address the two main issues of scalability, a new approach to tvs based on Depth-First Branch and Bound Search that exploits the properties of the heur function is presented. The new approach includes an improved method of generating a pattern database and a method of performing a depth-first target value search.

Referring now to FIGS. 3-11, several embodiments or implementations of the present disclosure are hereinafter described in conjunction with the drawings, wherein like reference numerals are used to refer to like elements throughout, and wherein the various features, structures, and graphical renderings are not necessarily drawn to scale.

Figure 3:
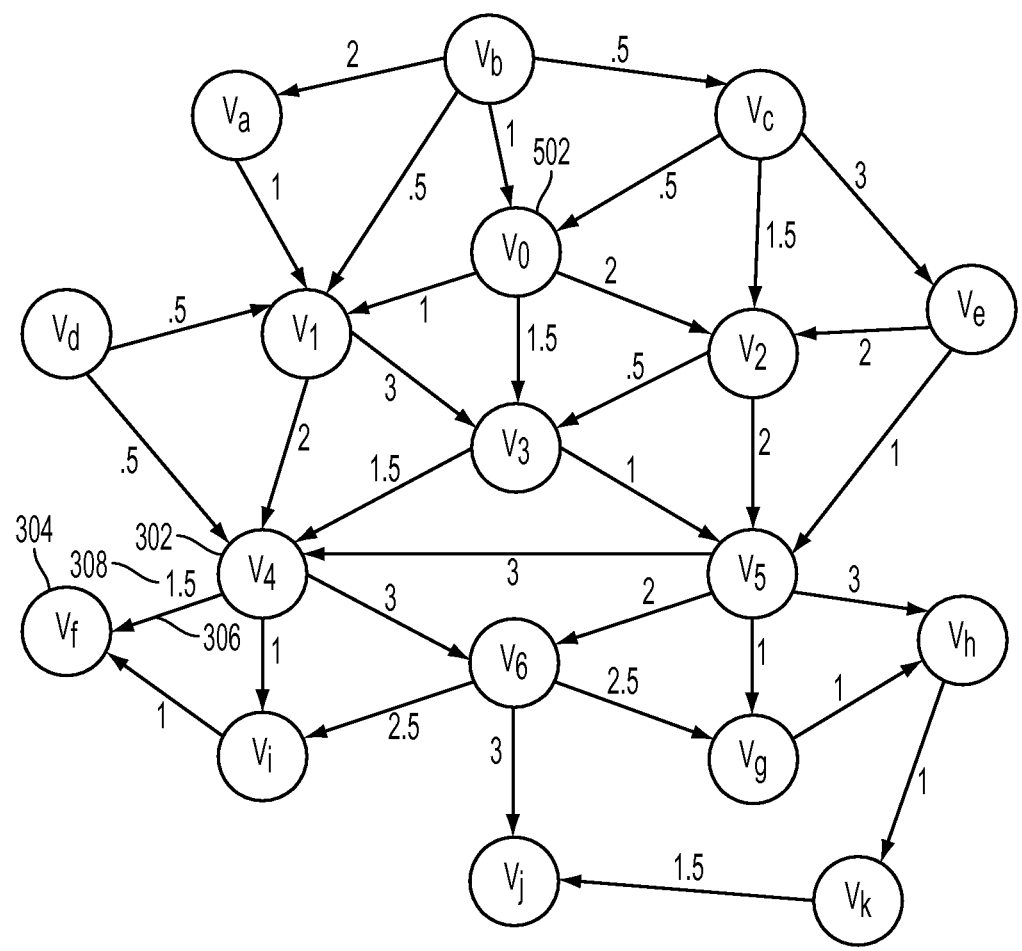
FIG. 3 is an illustration of a directed acyclic graph.

Referring to FIG. 3, a directed acyclic graph 300 is illustrated as called for by the depth-first target value search of the present invention. The graph is comprised of a plurality of vertices, such as vertices 302 and 304, interconnected by a plurality of edges, such as edge 306. The graph is acyclic such that no vertex within the graph is both an ancestor and descendant of another vertex. The vertices may be representative of, but are not limited to, system states, physical destinations, or steps in a process. Similarly, the edges may be representative of, but are not limited to, actions, or temporal, spatial or physical connections, between vertices. The plurality of edges are directed and include edge weights (or values). In the case of edge 306, for example, the edge weight 308 is 1.5. Edge weights may be representative of, but are not limited to, distances, probabilities, times, or speeds.

Figure 4:
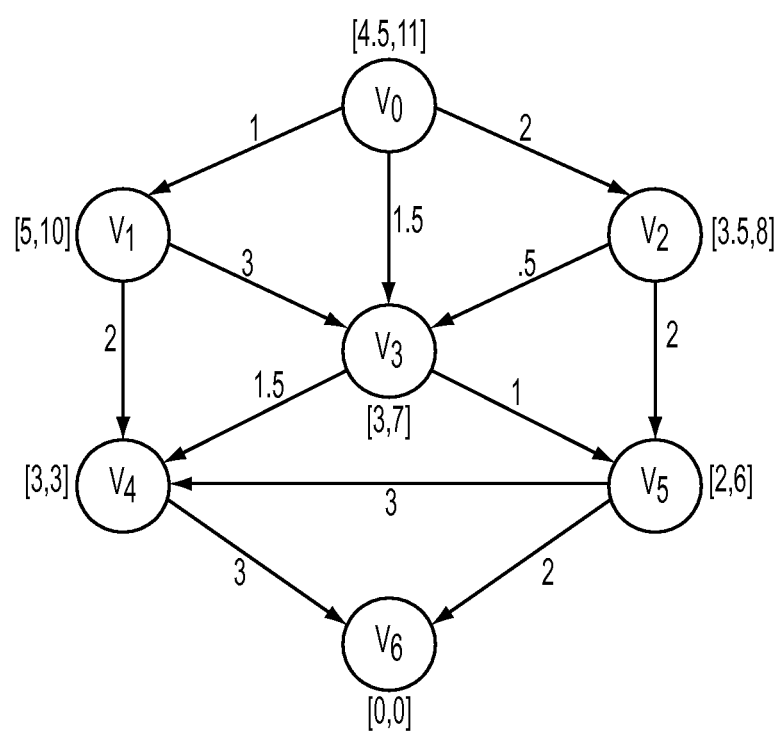
FIG. 4 is an illustration of a connection graph for a subset of vertices from the directed acyclic graph of FIG. 3.

Referring to FIG. 4, a connection graph of initial vertex $v_0$ and goal vertex $v_6$, from the graph 300 of FIG. 3, is illustrated. A connection graph of an initial vertex and a goal vertex is a subset of a graph and includes only the initial vertex, goal vertex, and the vertices that are both descendants of the initial vertex and ancestors of the goal vertex. As shown in FIG. 4, each vertex includes a range bound in proximity. The range bounds are shown in the form of [lower bound, upper bound], and as will be discussed below, are part of a pattern database. The connection graph will be used to illustrate the improved method of generating a pattern database between an initial vertex and a goal vertex.

Figure 5:
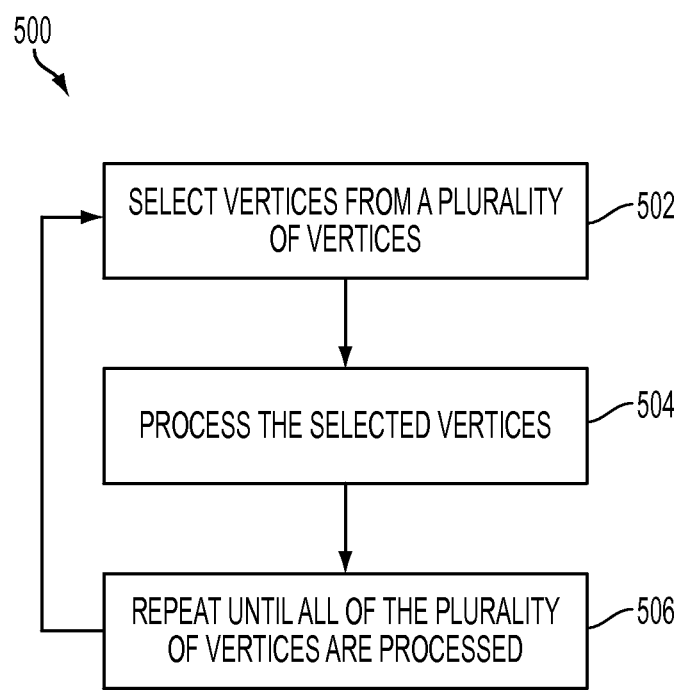
FIG. 5 is illustrates an exemplary method of generating a pattern database.

Referring to FIG. 5, the improved method 500 of generating a pattern database is illustrated. The method 500 operates on a connection graph, such as the connection graph of FIG. 4, and includes the steps of selecting vertices from the connection graph (Step 502), processing the selected vertices (Step 504), and repeating the preceding steps until all of the vertices in the connection graph are processed (Step 506).

The improved method 500 begins by selecting one or more vertices, which are ready for processing, from the connection graph (Step 502). The selection process is conducted in an inverse topological order. That is to say, starting from the bottom of the graph, vertices are selected which are ready for processing. As should be apparent, the bottom of the graph is defined by the goal vertex. If there are multiple vertices ready for processing it doesn't matter which order the vertices are selected in or how many are selected.

A vertex is ready for processing when all of its immediate descendants are processed. Drawing an analogy to a family, a parent is ready for processing when all of the parent's children have been processed. When the method is first beginning, the only vertex meeting this criteria is the goal vertex. This should be apparent because the method 500 operates on connection graphs, which, as defined above, only include vertices that are ancestors of the goal vertex. In other words, the goal vertex doesn't have any descendants. Thus, the method begins by selecting the goal vertex.

After one or more vertices are selected (Step 502), the vertices are processed (Step 504). If there are multiple selected vertices, the selected vertices may be processed sequentially or simultaneously. Because this exemplary method will generally be carried out in software, this may, but need not, translate to spawning new threads or forking. Processing encompasses shifting the range bound of each ancestor of the vertex being processed, combining the shifted range bounds of the descendants of the vertex being processed into a combined range bound, and then assigning the combined range bound to the vertex being processed.

The range bound of each descendant of the vertex being processed is shifted by the edge weight of the edge connecting the vertex being processed and the respective descendant. That is to say, the corresponding edge weight is added to the range bound of each descendant. A range bound will be described according to the same notation used in FIG. 4: [X, y]. The lower bound of the range bound is x and the upper bound of the range bound is y. Accordingly, suppose the vertex being processed has a first descendant with a range bound of [2, 5], and the edge weight of the edge connecting the vertex being processed and the first descendant is 0.5. Further suppose the vertex being processed has a second descendant with a range bound of [3, 6], and the edge weight of the edge connecting the vertex being processed with the second descendant is 2. In such a case, the shifted range bounds for the first descendant and the second descendant are [2.5, 5.5] and [5, 8], respectively. It should be appreciated that the shifted bounds do not replace the existing range bounds associated with the ancestors of the vertex currently being processed.

After the range bounds of the descendants of the vertex being processed are shifted, the shifted range bounds are combined. The shifted range bounds are combined by simply taking the smallest lower bound and the largest upper bound from the shifted range bounds of the descendants. For example, referring back to the preceding example, combining the shifted range bounds of [2.5, 5.5] and [5, 8] of the first descendant and second descendant, respectively, the combined range bound is [2.5, 8]. In the case of the goal vertex, which is selected first, and therefore processed first, the bound of the goal vertex is [0, 0]. This follows since range bounds include the lower and upper bounds on path lengths to the goal vertex. A path length from the goal vertex to itself is 0.

The combined range bound is thereafter assigned to the vertex being processed. That is to say, it is stored in the pattern database. As will be apparent to those skilled in the art, the pattern database may be part of the graph, or its own discrete entity. That is to say, the pattern database and the graph, from which the connection graph is based, will generally be implemented in electronic form, whereby the vertices and edges that form the graph will be stored in some type of electronic database. The range bounds for vertices may be stored with the vertices or may be stored in a separate database. Herein, database is used loosely to refer to a structured collection of records (stored in a computer system). The structured collection of records may be implemented with any electronic form of storage, such as a hard drive. The database may be stateless or stateful, and may be local or remote to the device implementing the improved method for generating a pattern database.

As would be understood, each vertex may alternatively make use of multiple range bounds (or intervals). In such a case, all of the range bounds of the descendants of a vertex will be shifted as described above. The only difference being that each descendant may have multiple range bounds to shift. Thereafter, the shifted range bounds are merged into a predefined number of range bounds. The range bounds are merged such that the range bounds that overlap are merged first, followed by the closest two range bounds.

After the selected vertices are processed (Step 504), the process repeats (Step 506). That is to say, a new one or more vertices are selected and then processed. This repetition continues until all of the vertices of the connection graph are processed. As should be apparent, the last vertex to be processed will be the initial vertex mentioned above. This follows because every vertex in the connection graph is a descendant of the initial vertex.

One specific implementation making use of the foregoing steps proceeds according to the following. The implementation begins by initializing a queue with the goal vertex, and a counter for each vertex, where the counter is initialized to the respective vertex's number of descendants in the connection graph. Alternatively, the counters can be maintained locally. At each step, the following is performed: remove the first vertex from the queue, combine the ranges from all its descendants of the vertex, and decrement the descendant counter of all the vertex's ancestors. Should the counter reach 0, the ancestor is added to the queue. As should be apparent, the counters ensure processing in an inverse topological order. The present approach is analogous to the old approach except that the present approach pulls all descendant ranges from descendants at once, whereas the old approach pushed ranges to ancestors in a piecewise manner.

In this implementation, each vertex in C will be processed only once. This can be shown through an inductive proof. Namely, if all of the descendants of V have been accessed only once, V's successor counter will be 0 and V will be added to the queue, whereby v will be processed once (induction step). $v_g$ starts on the queue and has no descendants in C, so $v_g$ (the global descendant) will only be accessed once (base case). From this follows, that each edge will be accessed twice (in the predecessor direction to update the counts and the other way to pull in the ranges) resulting in running time that is linear in the number of vertices and edges of $C(O(|N|+|E|))$. For the example graph (FIG. 2) this imposes the processing order: $a_0, a_1, \ldots, a_n, a_1$. There is still one potential issue with this approach: it does not impose any constant bounds on queue size. If the lattice graph shows little topological structure (i.e. all vertices other than $v_0$ and $v_g$ have exactly $v_0$ as predecessor and $v_g$ as successor), the queue can grow up to $|N|-2$ vertices in a lattice graph. Redeemingly, tvs is trivial in such graphs, as the number of paths is equal to $|N|-2$.

Notwithstanding this specific implementation of the improved method, applying the improved method for generating a pattern database to the connection graph of FIG. 4, the method begins by selecting the goal vertex $v_6$. The goal vertex $v_6$ is the only vertex which is ready for processing because the goal vertex $v_6$ is the only vertex in the connection graph that does not have any descendants. Processing the goal vertex $v_6$ yields a range bound of [0, 0] because there are no descendants and, as described above, range bounds correspond to the bounds of path lengths from the vertex being processed to the goal vertex.

The next vertex which is ready for processing is vertex $v_4$, because it's only descendant is goal vertex $v_6$, which is processed. Processing vertex $v_4$, the range bound of goal vertex $v_6$ is shifted by the edge weight associated with the edge connecting vertex $v_4$ with goal vertex $v_6$. This yields a shifted range bound of [3, 3]. Because vertex $v_4$ only has one descendant, there is no need to combine range bounds. Thus, the shifted range bound of [3, 3] is assigned to vertex 14.

The next vertex which is ready for processing is vertex $v_5$, because both of its descendants, goal vertex $v_6$ and vertex $v_4$, are processed. Processing vertex $v_5$, the range bounds of vertices $v_4$ and $v_6$ are shifted by corresponding edge weights. The range bound of vertex $v_4$ is shifted by an edge weight of 3 to yield a shifted range bound of [6, 6], and the range bound of vertex $v_6$ is shifted by an edge weight of 2 to yield a shifted range bound of [2, 2]. Combining the shifted range bounds of vertex $v_4$ and vertex $v_6$ gives vertex $v_5$ a range bound of [2, 6].

As should be apparent, the next vertex to be processed is vertex $v_3$, because both of its descendants, vertex $v_5$ and vertex $v_4$, are processed. Processing vertex $v_3$, the range bounds of vertices $v_4$ and $v_5$ are shifted by corresponding edge weights. The range bound of vertex $v_4$ is shifted by an edge weight of 1.5 to yield a shifted range bound of [4.5, 4.5], and the range bound of vertex $v_5$ is shifted by an edge weight of 1 to yield a shifted range bound of [3, 7]. Combining the shifted range bounds of vertex $v_4$ and vertex $v_5$ gives vertex $v_3$ a range bound of [3, 7]. Because the shifted range bound of vertex $v_4$ falls wholly within the shifted range bound of vertex $v_5$, it has no affect on the range bound of vertex $v_3$.

At this point, there are two vertices which are ready for processing: vertex $v_1$ and vertex $v_2$. Vertex $v_1$ is ready for processing because both of its descendants, vertex $v_3$ and vertex $v_4$, are processed. Similarly, Vertex $v_2$ is ready for processing because both of its descendants, vertex $v_3$ and vertex $v_5$, are processed. It doesn't matter which vertex is processed first, so vertex $v_1$ is arbitrarily selected first. Processing vertex $v_1$, the range bounds of vertices $v_4$ and $v_3$ are shifted by corresponding edge weights. The range bound of vertex $v_4$ is shifted by an edge weight of 2 to yield a shifted range bound of [5, 5], and the range bound of vertex $v_3$ is shifted by an edge weight of 3 to yield a shifted range bound of [6, 10]. Combining the shifted range bounds of vertex $v_4$ and vertex $v_3$ gives vertex $v_1$ a range bound of [5, 10]. Processing vertex $v_2$ next, the range bounds of vertices $v_3$ and $v_5$ are shifted by corresponding edge weights. The range bound of vertex $v_3$ is shifted by an edge weight of 0.5 to yield a shifted range bound of [3.5, 7.5], and the range bound of vertex $v_5$ is shifted by an edge weight of 2 to yield a shifted range bound of [4, 8]. Combining the shifted range bounds of vertex $v_3$ and vertex $v_5$ gives vertex $v_2$ a range bound of [3.5, 8].

There is now only one vertex which is not processed yet: vertex $v_0$. Vertex $v_0$ is ready for processing because its descendants, vertex $v_1$, vertex $v_3$ and vertex $v_2$ are all processed. Processing vertex $v_0$, the bounds of vertices $v_1$, $v_3$ and $v_2$ are shifted by corresponding edge weights. The range bound of vertex $v_1$ is shifted by an edge weight of 1 to yield a shifted range bound of [6, 11], the range bound of vertex $v_3$ is shifted by an edge weight of 1.5 to yield a shifted range bound of [4.5, 8.5], and the range bound of vertex $v_2$ is shifted by an edge weight of 2 to yield a shifted range bound of [5.5, 10]. Combining the shifted range bounds of vertex $v_1$, vertex $v_3$ and vertex $v_2$ gives vertex $v_o$ a range bound of [4.5, 11].

In view of the forgoing discussion of the improved method of generating a pattern database, it should be apparent that the improved method only visits a vertex once.

As such, the time it takes to perform the improved method is proportional to the number of vertices in the connection graph. That is to say, the time complexity of the improved method is linear. This advantageously improves target value search approaches making use of a pattern database, because such approach were relying on methods of generating a pattern database with exponential time complexity.

Figure 6:
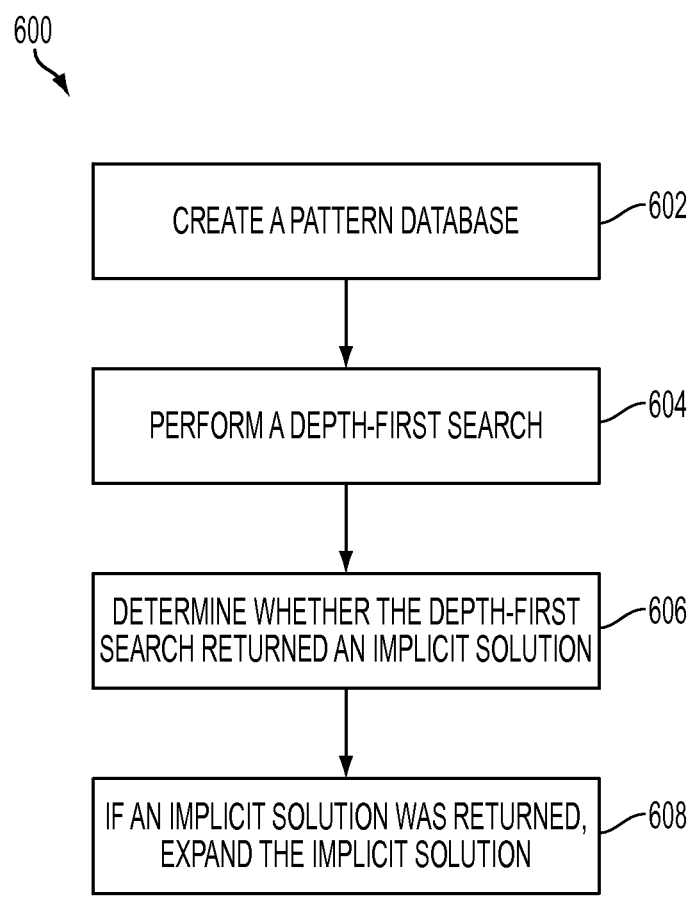
FIG. 6 is an illustration of an exemplary method of performing a depth-first target value search.

Referring to FIG. 6, the exemplary method 600 of performing a depth-first target value search between an initial vertex and a goal vertex is illustrated. As with the improved method of generating a pattern database (see 500 of FIG. 5), the method 600 operates on a connection graph, such as the connection graph of FIG. 4. The method 600 for performing a depth-first target value search includes the steps of performing a depth-first search (Step 604), determining whether the solution returned by the depth-first search is an implicit solution (Step 606), and if solution returned is an implicit solution, expanding the implicit solution (Step 608). The exemplary method optionally includes the step of creating a pattern database (Step 602). It should be appreciated that a depth-first search is different than a depth-first target value search.

The method 600 optionally begins by creating a pattern database for the initial vertex and the goal vertex (Step 602). If the pattern database already exists, it is unnecessary to recreate the pattern database. However, the pattern database is created some time before the depth-first search of step 604 is performed. The pattern database may be created in any number of ways, including, but not limited to, the old approach, mentioned in the background section, and the improved method. The preferred method of generating the pattern database is, however, the improved method, because this method creates the pattern database in a time linear manner, as opposed to an exponential manner. That is to say, the time complexity of creating the pattern database is 0(V), where V corresponds to the number of vertices.

Once the pattern database exists (Step 602), the depth-first target value search performs a depth-first search for the target value (Step 604). As will be apparent to one skilled in the art, the depth-first search can be performed in a recursive form, iterative form, or other like forms. While searching for the target value, the depth-first search preferably maintains a current search prefix. The current search prefix is the path extending from the initial vertex to a lead vertex. The lead vertex is the vertex the depth-first search is currently processing. For example, with reference to FIG. 4, if the depth-first search traversed to vertex $v_3$ by way of vertex $v_1$, the current search prefix would be a set of vertices comprising vertex $v_0$, vertex $v_1$, and vertex $v_3$, where vertex $v_3$ is the lead vertex. As should be appreciated, the lead vertex is the descendant of all of the other vertices in the current search prefix.

At each lead vertex which is being processed, the depth-first search checks to see if a perfect solution has been found. Namely, the depth-first search checks to see if the path length of the current search prefix is equal to the target value, and whether the lead vertex is the goal vertex. If a perfect solution is found, the depth-first search preferably ends and returns the current search prefix. For example, in a recursive implementation, the implementation might construct the tvp by traversing its call-stack and terminating immediately. However, under different embodiments the depth-first search may continue to find any other perfect solutions.

Assuming a perfect solution has not been found, the depth-first search determines a heuristic value for the lead vertex according to the following equation:

$$heur(p) = \begin{cases} 0 & \text{if } r.lb \le tv' \le r.ub \\ \min(|r.lb - tv'|, |r.ub - tv'|) & \text{otherwise} \end{cases}$$

The heuristic compares the target value to go tv' with the range bound r for the lead vertex of the prefix p and returns the minimum deviation of the target value to go tv' from the range bound r. The target value to go tv' is simply the difference between the target value and the path length of the current search prefix p. The range bound r, as described above, is stored in the pattern database and provides the lower r. lb and upper r. ub bound on the path lengths extending from the lead vertex to the goal vertex. A path length extending from the lead vertex to the goal vertex is hereinafter referred to as a suffix. Thus, the target value to go tv' corresponds to a perfect suffix length and the range bound r provides the bounds of actual suffix lengths. As should be apparent, a prefix and a suffix together define a path from the initial vertex to the goal vertex.

If the target value to go tv' falls inside the range bound r, the heuristic returns a minimum deviation of zero, because there could be a suffix with a path length equal to the target value to go tv'. That is to say, there could be a perfect solution. However, other than the possibility of there being a solution, no guidance is given. If the target value to go tv' falls outside the range bound r, there are no suffixes that can lead to a perfect solution. Accordingly, the heuristic returns the minimum deviation of the target value to go from the range bound r of the lead vertex. This minimum deviation allows a determination of the best possible path length with the current search prefix. That is to say, the path length of the current search prefix can at best have a path length equal to the target value plus or minus the minimum deviation.

While the heuristic described above concerns a pattern database in which each vertex has been assigned a single range bound, the heuristic may be modified as shown below to account for a pattern database in which each vertex is assigned multiple range bounds (i.e., multiple intervals).

$$heur(p) = \begin{cases} 0 \\ \min_{r \in pdb(p.last)} (|r.lb - tv'|, |r.ub - tv'|) \end{cases}$$

if ∃ r: r.lb ≤ tv' ≤ r.ub otherwise

Essentially, the heuristic performs the same task as above, but instead returns zero if the tv' falls within any of the range bounds of the lead vertex. Similarly, if the tv' does not fall within any of the range bounds, the heuristic returns the minimum deviation of the tv' from the range bound of the lead vertex that is closest to the tv'.

Once the heuristic value has been determined, the depth-first search may continue traversing the connection graph in at least two ways. First, if a heuristic value of zero is returned, there may be a suffix offering a perfect solution, but it is unknown. Accordingly, the depth-first search continues to traverse the connection graph along the current search prefix and explores the corresponding suffixes. It should be appreciated that as soon as the depth-first search begins to explore the suffixes, the current search prefix changes and there is potentially a new set of suffixes to explore. Second, if a positive heuristic value is returned, there is no need to explore the suffixes of the current search prefix, because there is no suffix offering a perfect solution. However, there may not be a perfect solution elsewhere within the connection graph, so the current search prefix may still be the best prefix. Accordingly, the heuristic value of the current search prefix is compared with that of previous current search prefixes. If the current search prefix is less than previous current search prefixes, the current search prefix should be saved because it offers a better solution than the previous current search prefixes.

Figure 7:
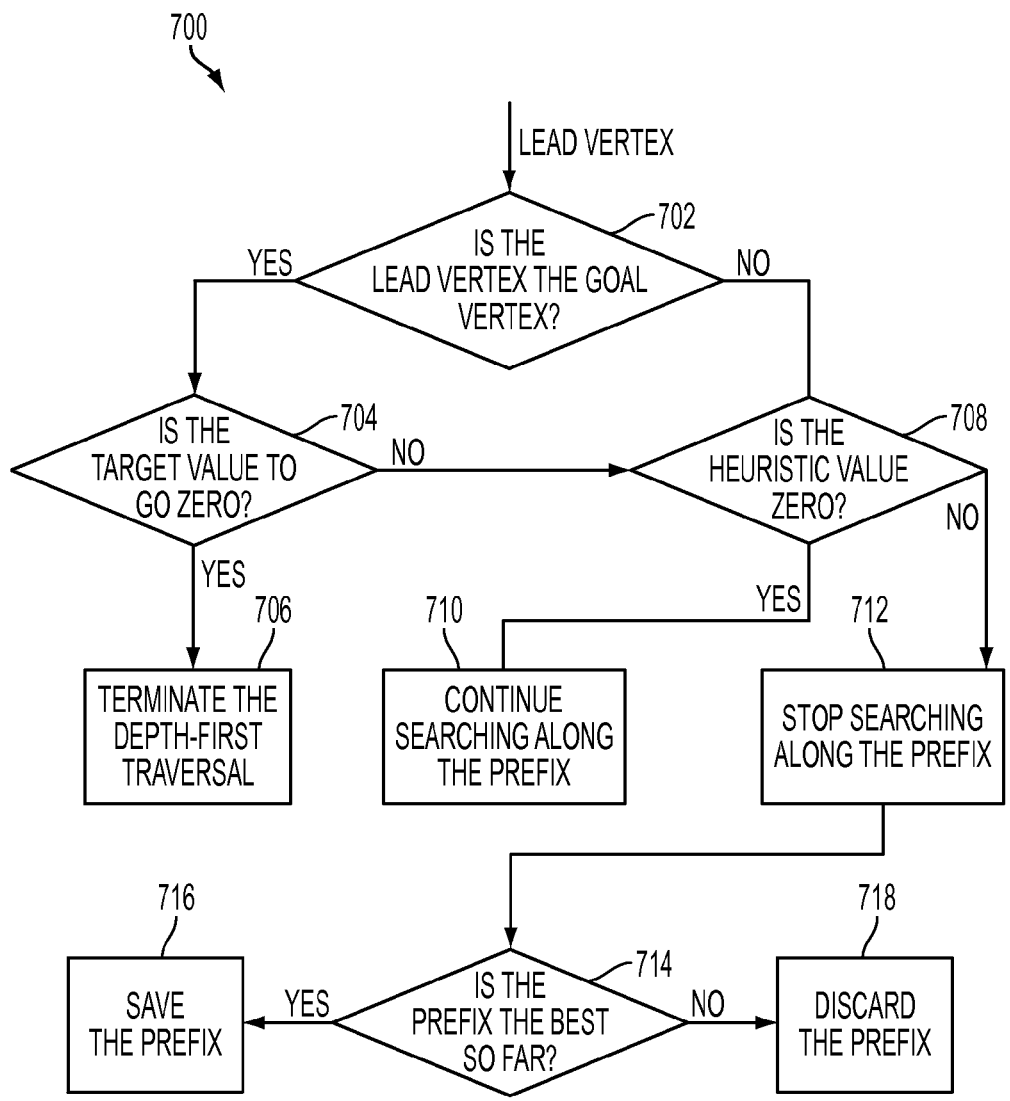
FIG. 7 is a flow chart of the exemplary logic performed by the depth-first search of the depth-first target value search of FIG. 7.

With reference to FIG. 7, a flow chart 700 of the exemplary logic performed by the depth-first search for each lead vertex processed is illustrated. First, the depth-first search checks whether the lead vertex is the goal vertex (Step 702). If the lead vertex is the goal vertex, the depth-first search checks whether the target value to go is zero (Step 704). As mentioned above, the target value to go is simply the path length of the current search prefix minus the target value. If the target value to go is zero, a perfect solution has been found and the depth-first search can terminate (Step 706). As mentioned above, the depth-first search can alternatively continue to search the rest of the connection graph and find any other perfect solutions. If the lead vertex is the goal vertex and the target value to go is not zero, or the lead vertex is not the goal vertex, the heuristic value is checked to see whether it is zero (Step 708). If it is zero, the depth-first search must continue searching along the current search prefix because there might be a perfect solution (Step 710). However, if the heuristic returns a positive value, the best completion of the current search prefix from the target value is known. Accordingly, it is not necessary to continue searching for the target value along the current search prefix (Step 712). It is, however, necessary to determine whether the current search prefix is the best current search prefix encountered so far (Step 714), because a perfect solution may not be found. Thus, if the current search prefix is the best current search prefix encountered so far, it must be saved (Step 716). Otherwise, the current search prefix may be discarded (Step 718). It is to be understood from the foregoing discussion that the target value to go is not a stopping criterion. A target value to go of zero means nothing except in the sense that finding the goal vertex with a target value to go of zero means a perfect solution is found and the search can terminate.

Notwithstanding how foregoing logic is implemented, the depth-first search returns either an explicit solution or an implicit solution. An explicit solution is a complete solution, i.e., a path extending from the initial vertex to the goal vertex, and an optimal solution. An optimal solution is the best solution possible. An explicit solution may be a perfect solution, which is returned by the depth-first search when the current search prefix has a lead vertex equal to the goal vertex and the path length of the current search prefix is equal to the target value (i.e., the path length of the explicit solution is equal to the target value). Alternatively, if there is not a perfect solution, an explicit solution may be the best prefix found. In contrast, an implicit solution is an incomplete solution, i.e., a path that extends from the initial vertex to an ancestor of the goal vertex, and exists if there is no explicit solution. The implicit solution corresponds to the best prefix found while traversing the connection graph and comprises part of the explicit solution. As should be appreciated, the depth-first search only traverses through the paths of the connection graph for which the heuristic is zero. Obviously, if an explicit solution is found, the target path is complete and nothing more needs to be done. However, if an implicit solution is returned, the target path is incomplete, such that the implicit solution must be expanded into an implicit solution. Namely, a suffix to complete the prefix needs to be found. Accordingly, referring back to FIG. 6, after the depth-first search is completed (Step 604) a determination must be made as to whether an implicit solution was returned by the depth-first search (Step 606). Alternatively, one can forgo this step and simply expand the returned solution regardless of its type (i.e., explicit or implicit). Namely, expansion of an already complete explicit solution is the explicit solution.

Assuming an implicit solution was returned by the depth-first search, the prefix is expanded (Step 608). To expand the prefix and find the best suffix, a simple best-first search of the connection graph is performed. Namely, starting at the lead vertex of the best prefix, expansion of the best prefix begins by adding the descendant of the lead vertex with the smallest heuristic value. That is to say, if the lead vertex has a first descendant and a second descendant with heuristic values of 0.1 and 0.2, respectively, the first descendant is added to the prefix. As should be appreciated, this defines a new lead vertex. The foregoing step is then repeated until the goal vertex is added to the prefix. At this point, the implicit solution has been expanded into the target path. This best-first expansion works because, due to the way the pd is built, heur is monotone. That is, for any prefix p and its descendant p', heur(p')≥heur(p) holds. In particular, for any prefix p, heur(p)>0 there will be at least one immediate descendant with an equal heuristic value, indicating it represents part of the optimal completion of p.

One specific implementation making use of the foregoing steps is embodied in the following pseudo code. As shown below, Algorithm 1 is the depth-first target value search (DFTVS) of the present application. Algorithm 1 sets the connection graph and computes a pattern database for $v_g$. Thereafter, it calls the depth-first search of Algorithm 2, which computes $pre_{opt}$, $f_{opt}$ and $tv'_{opt}$. $pre_{opt}$ and $tv'_{opt}$ are then fed to the best-first expansion of Algorithm 3 to (if necessary) expand $pre_{opt}$ to the tvp. Finally, Algorithm 1 returns the tvp and its deviation from tv.

Algorithm 2, the depth-first search, first checks whether to end its depths-first traversal: that is, if pre is a path either to the goal vertex $v_g$ or leads out of the blind-zone (f(pre)>0).

If in addition, pre dominates the current pre$_{opt}$, it replaces the latter. Otherwise, traversal continues: iteratively, each outgoing edge of V is concatenated to pre, the corresponding target-value tv' computed, followed by a recursive call to itself. If this descent produced a perfect target value path tvp, the recursion is terminated, preventing an unnecessary sweep of v's remaining descendants. Finally, pre is restored to its prior value in preparation for the next edge.

The termination test of Algorithm 3, the expansion procedure, is whether pre ends in the goal vertex $v_g$. Otherwise it computes the best outgoing edge of pre's last vertex and its corresponding target value tv', concatenates the edge to pre and calls itself on the new pre. The prefix produced by the depth first search is either an explicit solution (if it ends in $v_g$ and thus represents a perfect tvp), or an implicit solution, whose best completion leads to an optimal solution. In the latter case, a greedy expansion of pre by its best successor suffices to reconstruct the target-value path.

---

Algorithm 1: DFINS($v_0$, $v_g$, tv)

Input:
  $v_0$: vertex;                                                             // start
  $v_g$: vertex;                                                             // goal
  tv': float;                                                         // target value
begin
1    setConnectionGraph($v_0$, $v_g$);
2    buildPdb($v_g$);
     path pre: = pathFrom($v_0$);
     path pre$_{opt}$: = ∅;
     float $f_{opt}$: = ∞;
     float tv'$_{opt}$: = ∞;
3    DFBnB(pre, tv, $v_g$, pre$_{opt}$, $f_{opt}$, tv'$_{opt}$);
4    EXP(pre$_{opt}$, tv'$_{opt}$, $v_g$);
5    return (pre$_{opt}$, $f_{opt}$);
end

---

Algorithm 2: DFBnB(pre, tv', $v_g$, pre$_{opt}$, $f_{opt}$, tv'$_{opt}$)

Input:
  pre: path;                                         // $v_0 \rightarrow \ldots \rightarrow v$
  tv': float;                                      // tv-g(pre)
  $v_g$: vertex;                                    // goal
Output:
  pre$_{opt}$: path;                       // $v_0 \rightarrow \ldots \rightarrow v$
  tv'$_{opt}$: float;                    // tv-g(pre$_{opt}$)
  $f_{opt}$: float;                     // f(pre$_{opt}$)
begin
     vertex v: = endOf(pre);
     float val$_f$: = f(v, tv');
1    if v = $v_g$ ∨ val$_f$ > 0 then
2       if val$_f$ < $f_{opt}$ then
          pre$_{opt}$: = pre; $f_{opt}$: = val$_f$; tv'$_{opt}$: = tv'
       return;
3    foreach edge e: outEdges(v) do
       addTo(pre, e);
       float tv'$_{new}$: = tv' - edgeVal(e)
4       DFBnB(pre, tv'$_{new}$, $v_g$, pre$_{opt}$, $f_{opt}$, tv'$_{opt}$);
5       if endOf(pre$_{opt}$) = $v_g$ ∧ $f_{opt}$ = 0 then
         return;
6       removeLast(pre);
end

---

Algorithm 3: EXP(pre, tv', $v_g$)

Input:
  tv': float;                                     // tv-g(pre)
  $v_g$: vertex;                                   // goal
Output:
  pre$_{opt}$: path;                   // $v_0 \rightarrow \ldots \rightarrow v_g$
begin
     vertex v: = lastOf(pre);
1    if v = $v_g$ then
       return;
     float val$_{min}$: = ∞;
     float tv'$_{best}$;
     edge $e_{best}$;
2    foreach edge e: outEdges(v) do
       float tv'$_{new}$: = tv' - edgeVal(e);
3       if f(target(e), tv'$_{new}$) < val$_{min}$ then
         val$_{min}$: = f(target(e), tv'$_{new}$);
         $e_{best}$: = e;
         tv'$_{best}$ = tv'$_{new}$;
4    addTo(pre, e)
5    EXP(pre, tv'$_{best}$, $v_g$);
end

---

Figure 8:
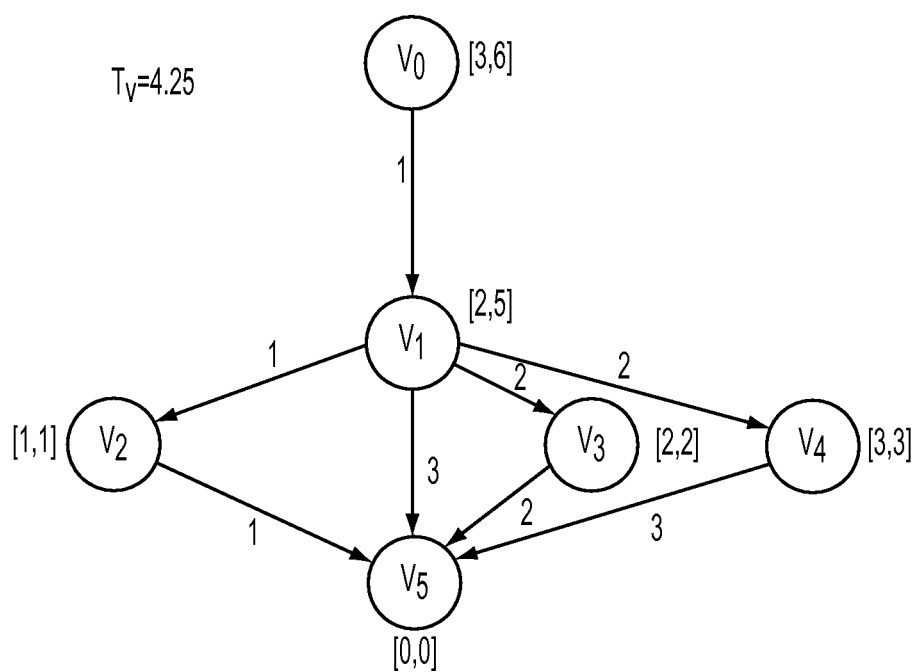
FIG. 8 is an illustration of a connection graph.
Figure 9:
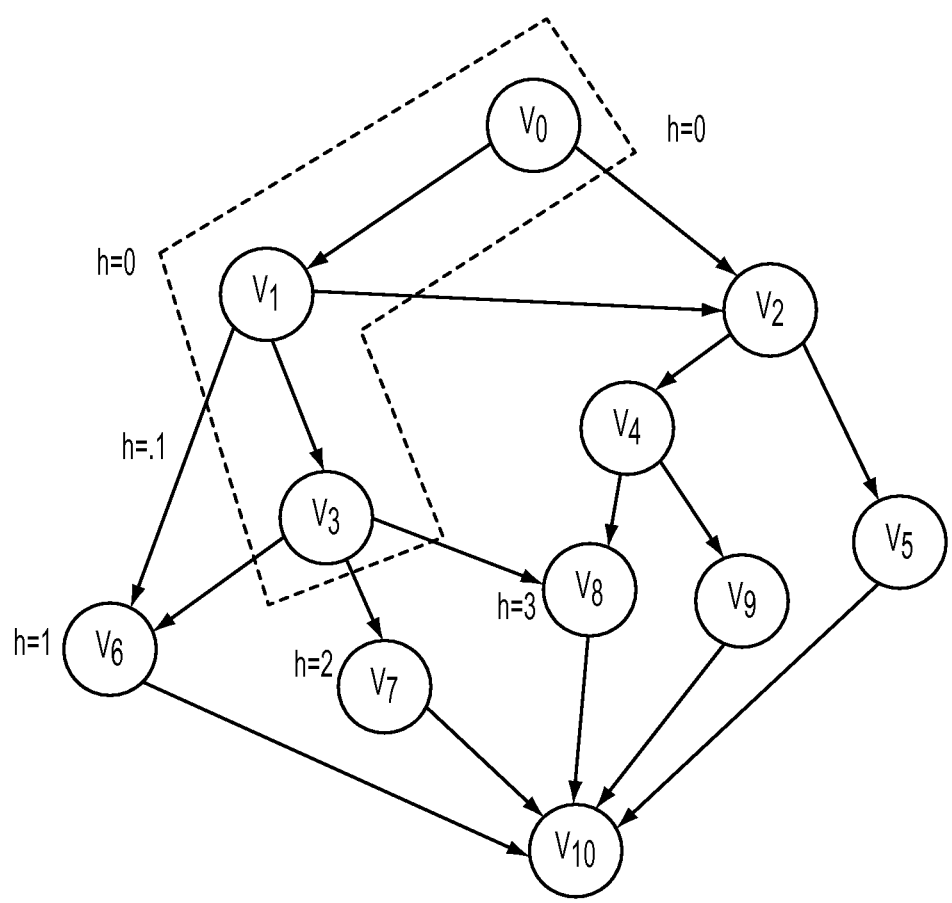
FIG. 9 is an illustration of a connection graph.

In view of the foregoing discussion, various aspects of the depth-first target value search will now be applied to the connection graphs of FIGS. 4, 8 and 9. For the connection graphs in FIGS. 4 and 8, the pattern database is computed and the range bound for each vertex is shown next to the corresponding vertex. In FIG. 9, the heuristic values are provided for each vertex in a prefix designated by a dashed box.

With respect to FIG. 4, application of the depth-first target value search will be applied to a scenario which will return a perfect solution. Assuming a target value of 8.5 is desired, the first step is to check whether vertex $v_0$ is the goal vertex and has a target value to go of 0. Obviously it is not the goal vertex, so the heuristic value for $v_0$ is determined. Herein, because the target value to go falls within the range bound, the heuristic value is 0. Thus, the traversal needs to continue.

The next vertex to be checked is vertex v. This vertex is chosen arbitrarily, and vertex $v_3$ and vertex $v_2$ are also valid choices. Vertex $v_1$ is not the goal vertex, so it is necessary to compute the heuristic value. The heuristic value in this case is also 0, because the target value to go is 7.5 and falls within the range bound of vertex v. Accordingly, the traversal needs to continue.

The next vertex to be checked is vertex $v_4$, which is again selected arbitrarily. Vertex $v_4$ is not the goal vertex, so the heuristic value is computed. The heuristic value in this case is 2.5 because the target value to go is 5.5, which falls outside the range bound of vertex $v_4$. At this point, it is known that the current search prefix of vertex $v_0$, vertex $v_1$, and vertex $v_4$ cannot yield a path length better than the target value plus or minus 2.5. Accordingly, it is not necessary to explore the suffixes of the current search prefix.

Back tracking through the prefix, the next vertex with a descendant that has not been explored is vertex $v_1$. Thus, vertex $v_3$, the descendant of vertex $v_1$, is explored next. Vertex $v_3$ is not the goal vertex so the heuristic is determined. The target value to go is 4.5, which falls within the range bound of vertex $v_3$, so the heuristic returns 0. Accordingly, further traversal of the suffixes of vertex $v_3$ is necessary.

Vertex $v_4$ is arbitrarily selected and visited next. Vertex $v_4$ is not the goal vertex, so the heuristic value is computed. The target value to go is 3 and falls within the range bound of vertex $v_4$, so the heuristic returns a value of 0. Accordingly, further traversal is necessary.

Vertex $v_6$ is explored next because it is the only descendant of vertex $v_4$. As should be apparent, vertex $v_4$ is the goal vertex. Additionally, the target value to go is 0, so a perfect solution is found. That is to say, the prefix comprised of vertex $v_0$, vertex $v_3$, vertex $v_4$ and vertex $v_6$ yields a path with a path length equal to the target value. Accordingly, the depth-first search can terminate and return the current search prefix as an explicit solution.

With respect to FIG. 8, application of the depth-first target value search will be applied to a scenario which will return a best solution. Assuming a target value of 4.25 is desired, the first step is to check whether vertex $v_0$ is the goal vertex and whether the target value to go is 0. Obviously neither of these conditions are met, so the heuristic value for $v_0$ is determined. Herein, because the target value to go falls within the range bound of vertex $v_0$, the heuristic value is 0. Thus, the traversal needs to continue.

Vertex $v_1$ is selected next because it is the only descendant of vertex $v_0$. Clearly vertex $v_0$ is not the goal vertex, so the heuristic is determined. Herein, the target value to go is 3.25, which falls within the range bound of vertex $v_1$. Accordingly, the heuristic returns a value of 0 and it is necessary to continue traversing the connection graph.

Vertex $v_2$ is arbitrarily selected next. Vertex $v_2$ is not the goal vertex and has a target value to go of 2.25. Because vertex $v_2$ is not the goal vertex, the heuristic is determined. The target value to go does not fall within range bound of vertex $v_2$, so the heuristic returns a minimum deviation of 1.25. That is to say, the best path length that can be achieved using the current prefix is the target value plus or minus 1.25. Because this is the best prefix encountered thus far, it is saved. Additionally, there is no need to continue traversing along the current prefix because the best completion is known. Thus, the depth first search back tracks until it finds a vertex with a descendant that has not been checked; in this case, vertex $v_1$.

Vertex $v_5$ is arbitrarily selected next because it is a descendant of vertex $v_1$. Clearly vertex $v_5$ is the goal node. However, the target value to go is 0.25, so the current prefix is not a perfect solution. Accordingly, the heuristic value is determined, which, as should be obvious, is 0.25. This minimum deviation is better than the minimum deviation of vertex $v_2$, so the current prefix is saved and the traversal of the connection graph continues.

The next vertex arbitrarily selected is vertex $v_3$. Vertex $v_3$ is not the goal vertex and has a target value to go of 1.25. Accordingly, the heuristic value is 0.75. This value is greater than the heuristic value of the current best prefix, so there is no need to save the current prefix. Thus, the depth-first search continues to search the remainder of the connection graph.

The last vertex selected is vertex $v_4$. Vertex $v_4$ is not the goal vertex and has a target value of 1.25. Determining the heuristic leads to a heuristic value of 1.75. This value is again greater than the heuristic value of the current best prefix, so there is no need to save the current prefix. Additionally, the entire connection graph has been searched, so the depth first traversal is complete.

In this case, the depth first traversal completed with an explicit solution, albeit imperfect solution. That is to say, it completed with a complete solution. Accordingly, the solution is already fully expanded and the target path has been found.

With respect to FIG. 9, expansion of an implicit solution will be illustrated. Suppose the depth-first search previously discussed returned an implicit solution equal to the prefix surrounded by the dashed line. In such a case, it would be necessary to expand the implicit solution. To do so, the descendants of the lead vertex are checked to determine the descendant with the smallest heuristic value. As shown in FIG. 9, the heuristic values are shown next to the descendants of vertex $v_3$, and vertex $v_6$ has smallest heuristic value. Thus, vertex $v_6$ is added to the prefix and the above procedure is repeated until the goal vertex is added to the prefix. The only descendant of vertex $v_6$ is vertex $v_{10}$, so obviously it has the smallest heuristic value. Accordingly it is added to the prefix, thereby completing the target path.

In view of the forgoing discussion of the depth-first target value search, it should be apparent that the depth-first target value search has a memory requirement linear with the target value. Namely, in contrast to the traditional A* approach, the memory requirements are bounded by the target-value. If one assumes positive edge values and lets $\epsilon > 0$ be the least edge-value in C, then at worst the target value path tvp for some tv will consist of $$\left\lceil \frac{tv}{\epsilon} \right\rceil + 1$$

vertices. Consequently, the algorithm's space requirement is 0(tv). Additionally, while the computational worst case complexity remains exponential in the number of vertices in C, application of the pattern database allows the depth-first search to prune the search space, thereby resulting in an improvement in run time. Thus, the depth-first target value search of the present application is an improvement over existing approaches for target-value searching.

Now that the depth-first target value search of the present application has been discussed, its application to systems such as a depth-first target value search engine and a model-based control system will be discussed.

Figure 10:
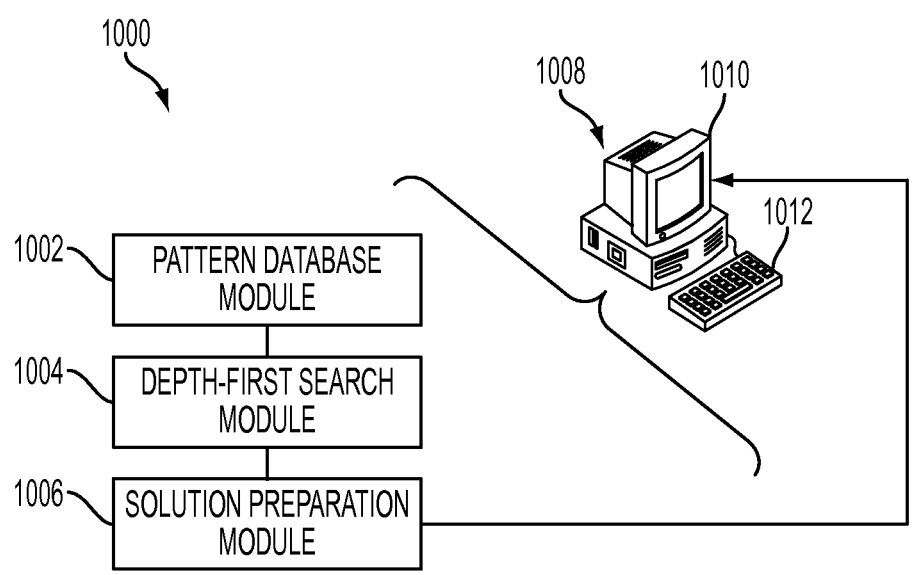
FIG. 10 is a depth-first target value search engine (DFTVS) employing the exemplary depth-first target value search of the present application.

With reference to FIG. 10, a depth-first target value search (DFTVS) engine 1000 is described. The DFTVS engine 1000 is suitably embodied by a computer 1008 or other digital processing device including a digital processor such as a microprocessor, microcontroller, graphic processing unit (GPU) or so forth and storage. In other embodiments, the DFTVS engine 1000 may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices such as an illustrated keyboard 1012 for receiving user input to control the DFTVS engine 1000, and further includes or is operatively connected with one or more display devices such as an illustrated display 1010 for displaying output generated based on the output of the DFTVS engine 1000. In other embodiments, the input for controlling the DFTVS engine 1000 is received from another program running previously to or concurrently with the DFTVS engine 1000 on the computer 1008, or from a network connection, or so forth. Similarly, in other embodiments the output may serve as input to another program running subsequent to or concurrently with the DFTVS engine 1000 on the computer, or may be transmitted via a network connection, or so forth.

The DFTVS engine 1000 includes a pattern database module 1002, a depth-first search module 1004 and a solution preparation module 1006. The pattern database module 1002 receives a connection graph from a source external to the DFTVS engine 1000, and generates a pattern database for the connection graph. The pattern database is preferable carried out using the improved method of generating a pattern database, discussed above. The depth-first search module 1004 receives the pattern database and the connection graph from the pattern database module 1002. The depth-first search module 1004 further receives a target value from a source external to the DFTVS engine 1000, such as the keyboard 1012. The depth-first search module 1004 uses the received target-value, pattern database and connection graph to find an implicit or explicit target path within the connection graph which has a path length most closely approximating the target value. The depth-first search module searches for the target path using the exemplary depth-first target value search of the present invention. The solution preparation module 1006 receives the explicit or implicit target path from the depth-first search module 1004 and determines whether the received target path needs further processing. This is the case when an implicit target path is received. In such a case, the solution preparation module expands the implicit target path using the best-first expansion discussed above. Thereafter, the expanded implicit target path or the explicit target path is output for display, printout and/or implementation into additional decision making mechanisms, such as planners.

In some embodiments, the exemplary methods, discussed above, the DFTVS engines employing the same, and so forth, of the present invention are embodied by a storage medium storing instructions executable (for example, by a digital processor) to implement the depth-first target value search. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Figure 11:
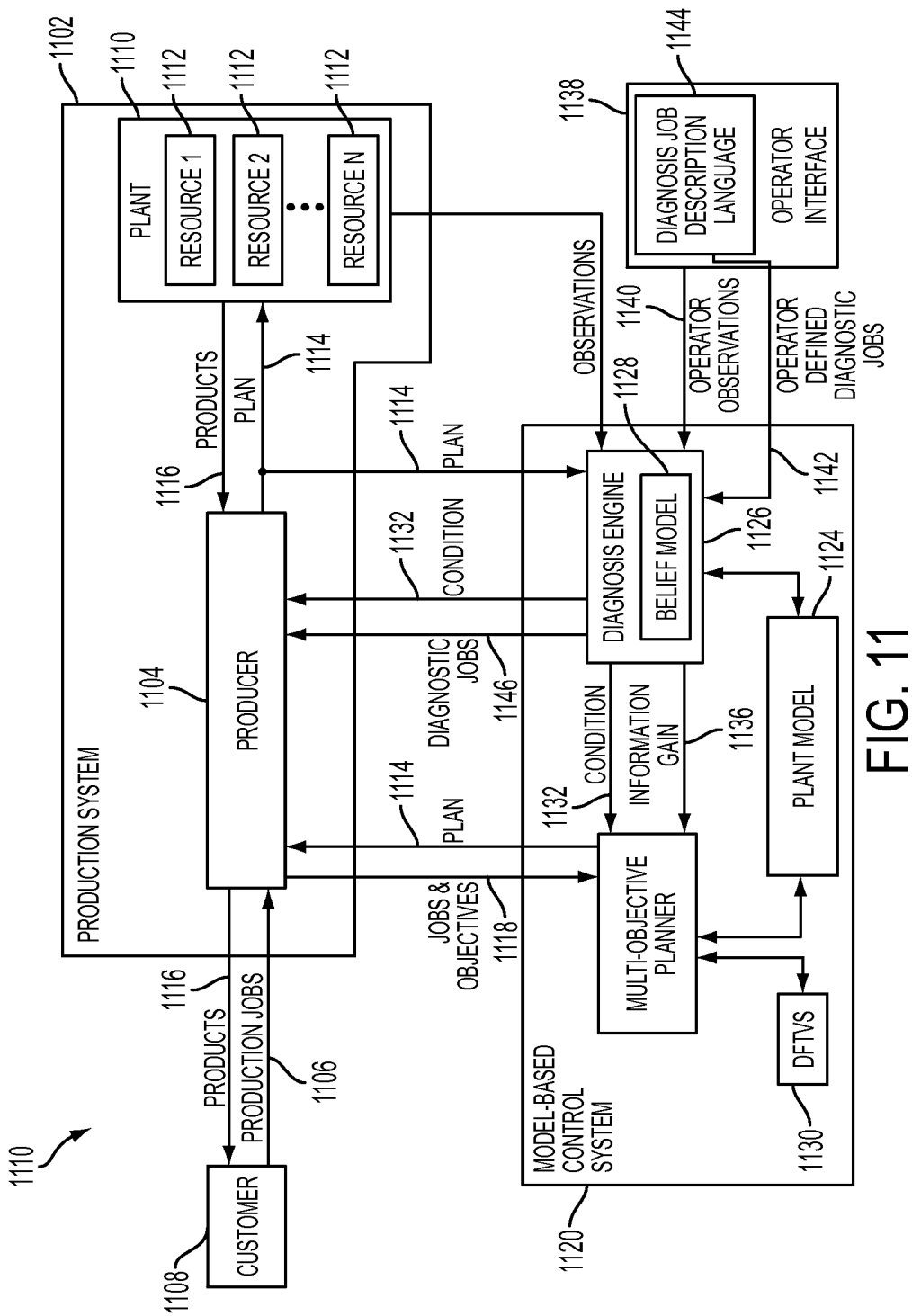
FIG. 11 is a schematic diagram illustrating a production system, an operative interface, and a model-based control system with a planner, a plant model, a diagnosis engine, and a DFTVS engine.

Turning to FIG. 11, the DVTVS engine is employed by a system 1100. The system 1100 includes a production system 1102 having a producer component 1104 that receives production jobs 1106 from customer 1108. The resources may be, but need not be, machines, software or logic components, objects, etc. The production system further includes a plant 1110 having a plurality of resources 1112 that may be selectively actuated or operated according to one or more plans 1114, so as to produce one or more products 1116 for provision to the customer 1108. Plans 1114 are comprised of a series of actions to achieve one or more production goals. The producer 1104 provides jobs and objectives 1118 to a multi-objective planner 1122 of model-based control system 1120, and production system 1102 receives plans 1114 from planner 1122 for execution in the plant 1110. The plans 1114 can include one or both of production and diagnostic goals.

As shown in FIG. 11, control system 1120 further includes a plant model 1124 of the plant 1110, a diagnosis engine 1126 with a belief model 1128 and a DFTVS module 1130. The diagnosis engine 1126 determines and updates a current plant condition 1132 based on one or more previously executed plans 1114, corresponding observations 1134 from the plant 1110, and the model 1124. The diagnosis engine 1126 also provides expected information gain data 1136 to the planner 1122 for one or more possible plans 1114 based on observations 1134 and the plant model 1124. The depth-first target value search (DFTVS) engine 1130 implements the exemplary depth-first target value search of the present invention and aids the multi-objective planner in constructing plans which facilitate pervasive diagnosis.

The primary objective of pervasive diagnosis is to use the diagnosis engine's beliefs to influence plans to gain additional information about the condition of the plant 1110. A plan is informative if it contributes information to the diagnosis engine's beliefs, and the plan outcome has a reasonable amount of uncertainty. The model-based control system 1120 facilitates pervasive diagnosis with the selective employment of intelligent on-line diagnosis through construction and execution of plans that provide enhanced diagnostic information according to the plant condition 1132 and/or the expected information gain 1136. The model-based control system 1120 may further facilitate pervasive diagnosis with the generation of one or more dedicated diagnostic plans for execution in the plant 1110 based on at least one diagnostic objective and the plant condition 1132. Thus, the model-based control system 1120 seeks to find a plan that achieves production goals and diagnostic goals.

The embodiment of FIG. 11 also includes an operator interface 1138 implemented in the form of a computer or other platform(s). Operator interface 1138 is operatively coupled with diagnosis engine 1126 to provide operator observations 1140 to the diagnosis engine 1126, with the diagnosis engine 1126 determining the current plant condition 1132 based at least partially on the operator observations 1140 in certain implementations. Moreover, the exemplary operator interface 1138 allows the operator to define a diagnostic job 1142 using a diagnosis job description language 1144, and the diagnosis engine 1126 may provide diagnostic jobs 1146 to the producer 1104. The diagnosis engine 1126 in this implementation is operative to selectively provide one or more self-generated diagnostic jobs 1146 and/or operator defined diagnostic jobs 1142 to the producer 1104, which in turn provides jobs and objectives 1118 to the planner 1122.

Referring back to the DFTVS engine 1130, the engine 1130 returns a plan operative to produce an optimal amount of diagnostic information to the planner 1122. In doing this, the engine 1130 maps a pervasive diagnosis problem to a target value problem. Thereafter, the DFTVS engine 1130 uses the exemplary depth-first target value search of the present application to solve the following equation and produce a plan with an optimal amount of uncertainty.

$$p^{opt} = \mathrm{argmin}_{achievesGoal(p) \in P} |Pr(ab(p)) - T|$$

As should be apparent, $p^{opt}$ corresponds to an optimal plan. Additionally, $Pr(ab(p))$ is the failure probability of plan p, and T is the optimal uncertainty. P is a set of plans that achieves the goals for the optimal plan $p^{opt}$. As should appreciated, a plan with an optimal amount of uncertainty is a plan that produces an optimal amount of information.

To map a pervasive diagnosis problem to a target value problem, a graph and a connection graph, derived from the graph, is constructed. The vertices of the graph correspond to system states and the edges of the graph correspond to actions. A plan corresponds to a plurality of actions. Additionally, the edge weights correspond to the failure probability of the corresponding edge (or action), and the optimal amount of uncertainty corresponds to the target value.

With to reference FIGS. 12-18, the following describes an empirical evaluation of DFTVS comparing it to BFTVS on two synthetic test domains sparse and dense. Tests were performed on a machine with a 2.8 GHz Intel Core 2 Duo CPU with 4 GB of ram running Mac OS X 10.5.6. All processes were implemented as parts of a uniform framework, to allow for fair runtime comparisons.

Figure 12:
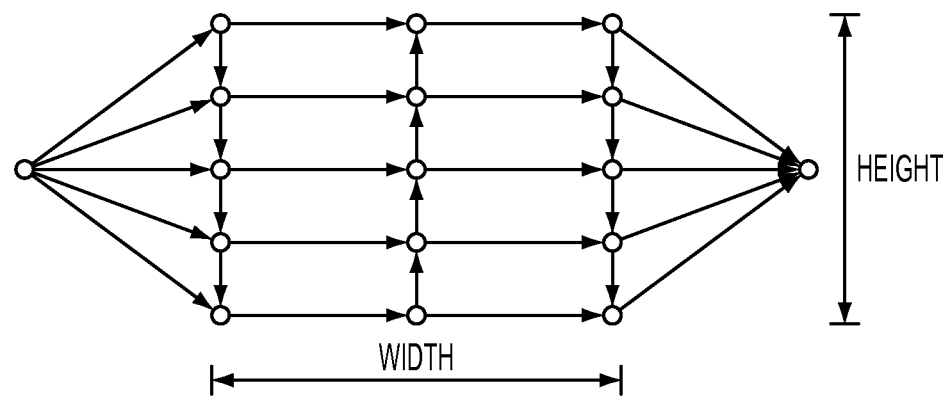
FIG. 12 illustrates a sparse domain.

Both sparse and dense domains represent connection-graph lattices, consisting of designated start and goal vertices and a "grid" of vertices between them. Generally edge values are assigned randomly (sampled from a uniform (0; 1] distribution). The domains can both be parameterized in terms of width, height and a seed value for a random-number generator. In the sparse domain, vertices (with the exception of v0 and vg) have a constant out-degree of 2, and path-lengths (in number of vertices) between start and goal vary between width+2 and height*width+2. A general connection pattern for a sparse domain is shown in FIG. 12, wherein the sparse domain, vertices are always connected to their "right", as well as their "lower" or "upper" neighbors (depending on whether the column is "odd" or "even".

The dense domain has uniform path-lengths (in number of vertices) of width +2. It has an additional parameter, a probability p, which governs the out-degree of nodes in a grid. Particularly, a vertex has a connection to a vertex in its "right" neighbor column with probability p (besides its direct right neighbor, with whom it is always connected). This results in an average out degree of $p*(width-1)+1$, (which is approximately $p*\sqrt{|V|}$ for the "square" graphs primarily used in the evaluation). In general, for "square" graphs, the term dimension (d) is used to denote width and height parameters. Also, if not otherwise noted, we allowed (up to) 5 ranges per vertex are allowed and 0.5 was used as probability parameter for the dense domain.

Figure 13:
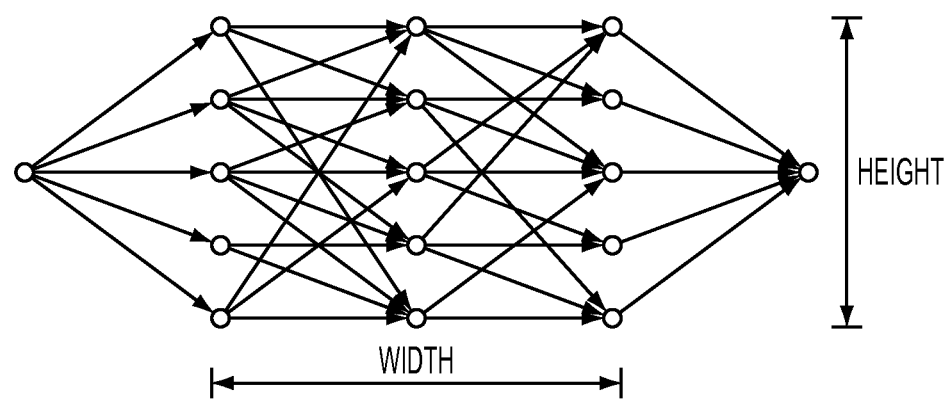
FIG. 13 illustrates a dense domain.

A general connection pattern for the dense domain is illustrated in FIG. 13, where vertices are always connected to their "right" neighbor; additionally, for each other vertex in the "right" neighboring column, there is a connection with probabilityp.

Both domains are hard in that they contain a large number of paths (exponential in width for dense, and in width*height for sparse).

Figure 14:
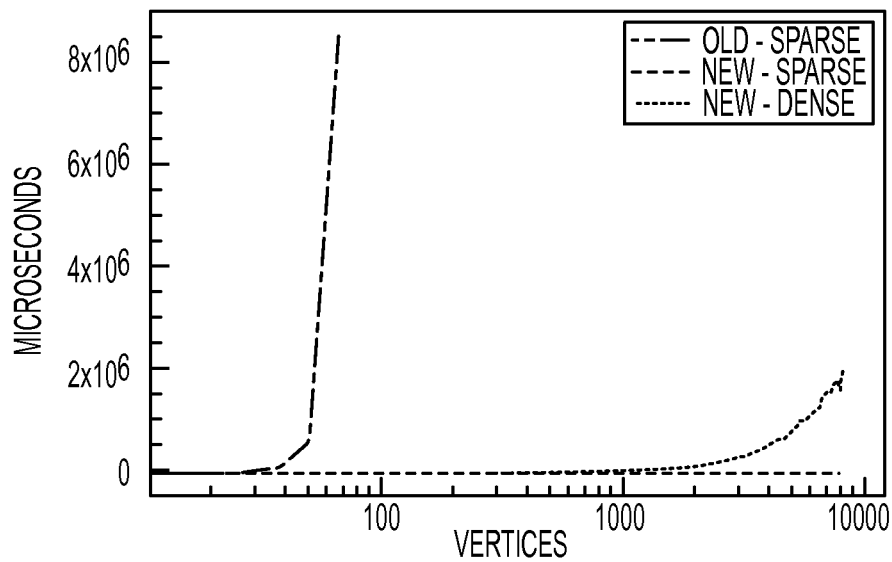
FIG. 14 is a graph of pd construction times.

FIG. 14 gives a comparison of the time (in μsec) needed to build the pattern database for different graphs (dimensions 3-90) using the old method and the presently described process. Each datapoint represents an average of graphs (different random seeds). The results show that the high computational overhead limits the old approach to very small graphs. The superlinear scaling of the new approach in the dense domain is due to the amount of edges in the dense domain growing quadratically in the height parameter. Average construction times were between 50 μsec (d=3) and 28 msec (d=90) for the sparse domain.

The larger pd computation time for building the pd is the only sense, in which dense is the harder domain. For all other purposes, the much longer prefixes of the sparse domain make it a much harder search problem for both domains.

Figure 15:
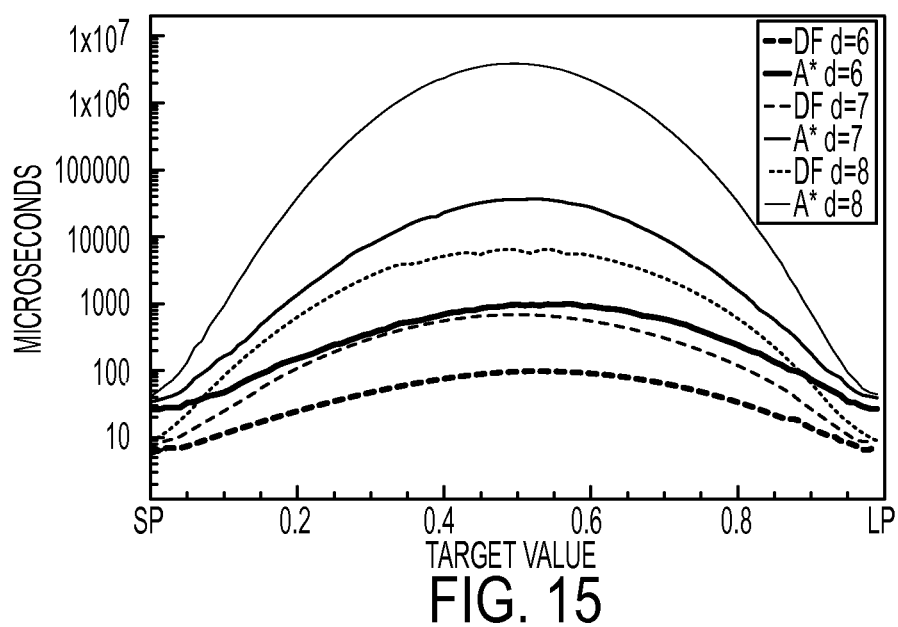
FIG. 15 is a graph of search times for different tvs.

Turning to actual searching, FIG. 15 shows the average time (in μsec), for tvs using the A* and the DFTVS algorithms with target-values ranging from the shortest- to longest-path lengths in the underlying dense graphs. Each datapoint represents an average of over 25 graphs. The runtime distributions reflect the normal distribution of path lengths in the dense domain. The problem is hardest, if the tv is right between the shortest- (SP) and longest-path (LP) of the graph, as most paths come close to the tv and can only be rejected late by the heuristic, resulting in a large blind-spot. The relative differences in running time widen rapidly from one order of magnitude at d=6 to three orders of magnitude at d=8 between BFTVS and DFTVS, so this comparison was limited to very small graphs.

Figure 16:
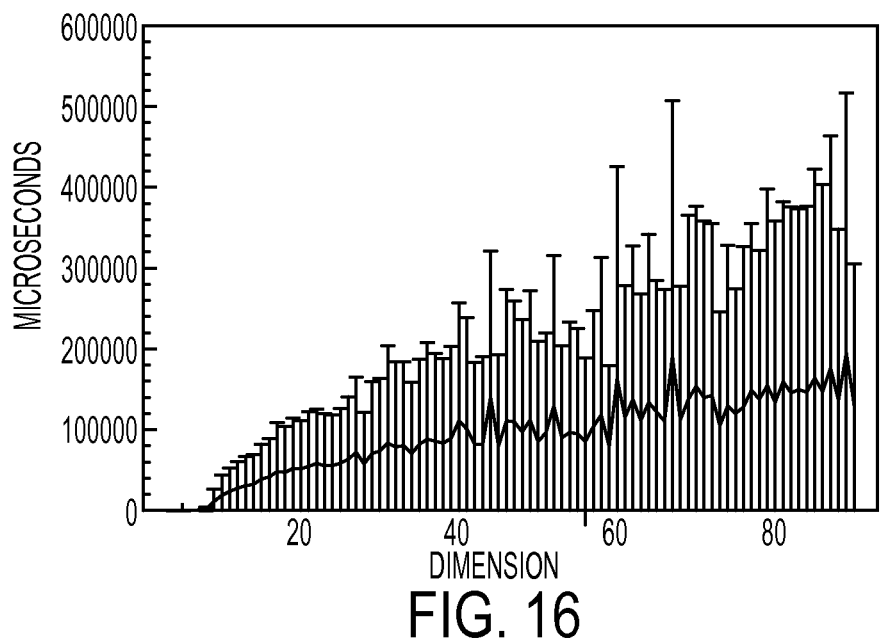
FIG. 16 is a graph of mean and standard deviation for search times in relation to domain size (DFTV/dense)
Figure 17:
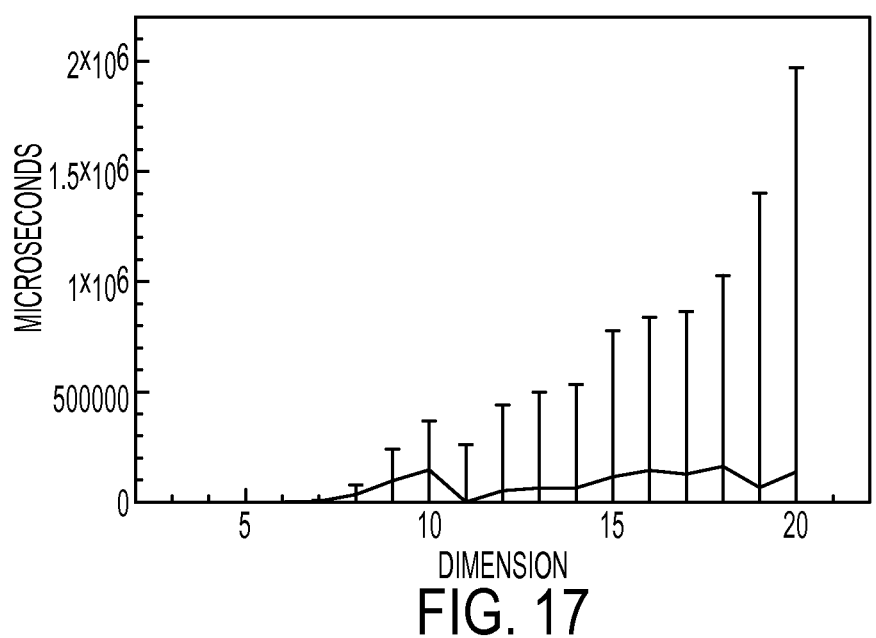
FIG. 17 is a graph of mean and standard deviation for search times in relation to domain size (DFTVS/sparse)

FIG. 16 gives an overview of DFTVS running time (μ=red line, σ=error bars) in relation to graph size. Per data-point, we created 10 instances (differing in their seed values) and executed 1000 queries with tv randomly sampled from a uniform [SP;LP] distribution against each. Note, how DFTVS's μ, σ for the 8102 vertex d=90 graph are about ⅒th and half BFTVS's μ, σ on the 66 vertex d=8 graph from FIG. 15. FIG. 17 shows the same for the sparse domain, where due to the potentially much larger prefixes involved, scaling is significantly worse.

FIG. 17 illustrates mean and standard deviation for search times in relation to domain size, for a DFTVS/sparse domain.

Figure 18:
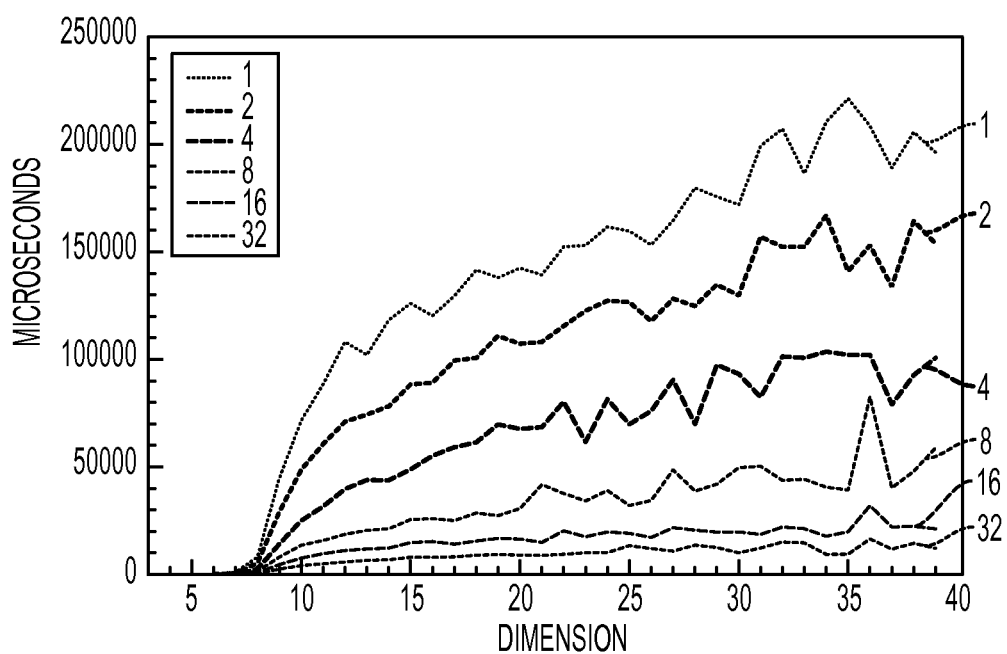
FIG. 18 is a graph of means of search times for different range set sizes in relation to domain size (DFTVS/dense).

FIG. 18 shows the influence of the number of ranges per vertex in the pd on average search time in a DFTVS/dense domain.

Applying the depth-first target search of the present application requires two assumptions to hold: there is at most one fault in the system at any given time; and an action appears at most once in the single plan. These two assumptions are necessary because the failure probability of a plan doesn't increase in the persistent fault case if the same action appears multiple times in the plan, and thus the problem is non-decomposable. That is to say, the pattern database cannot be used. If these assumptions hold, however, the depth-first target value search of the present application will find the optimal plan which produces an optimal amount of diagnosis information.

It is to be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

What is claimed is:

1. A model-based control system for controlling a production system, wherein said production system provides jobs and objectives to the model-based control system, said model-based control system comprising:
   a directed acrylic graph, wherein the directed acrylic graph includes a plurality of vertices interconnected by a plurality of edges;
   a planner operative to provide the production system with a plan, wherein said planner generates the plan using a depth-first target value search, wherein the depth-first target value search is configured to generate the plan with a failure probability most closely approximating a target value, the plan being in a form of a pattern database which includes the plurality of processed vertices which include a range bound for each of the processed plurality of vertices;
   a system model operative to model the behavior of the production system; and,
   a diagnosis engine operative to estimate failure probabilities for plans and provide diagnostic guidance to the planner, wherein the model-based control system including the directed acrylic graph, the planner, the system model and diagnosis engine are implemented via at least one digital processing device.

2. The model-based control system of claim 1, wherein the target value corresponds to the optimal amount of uncertainty in a plan outcome.

3. The system of claim 1, wherein said plurality of vertices include an initial vertex, a goal vertex, and one or more intermediate vertices, wherein said one or more intermediate vertices are both descendants of the initial vertex and ancestors of the goal vertex.

4. The system of claim 1, wherein the range bound for each of the selected one or more of the plurality of vertices is determined by combining the range bound for each descendant.

5. A non-transitory computer readable medium storing a program causing a computer to generate a pattern database for a model-based control system which employs target value searching, wherein said model-based control system includes a directed acyclic graph, wherein the directed acyclic graph includes a plurality of vertices interconnected by a plurality of edges, the generation of the pattern database comprising:
   (a) selecting one or more of the plurality of vertices which are ready for processing in an inverse topological order;
   (b) processing the selected one or more of the plurality of vertices, wherein processing includes assigning a range bound to each of the selected one or more of the plurality of vertices; and,
   (c) repeating steps (a) to (b) until each of the plurality of vertices is processed, wherein the pattern database is computed in time linear to the number of vertices plus edges of the graph.

6. The non-transitory computer readable medium of claim 5, wherein said plurality of vertices include an initial vertex, a goal vertex, and one or more intermediate vertices, wherein said one or more intermediate vertices are both descendants of the initial vertex and ancestors of the goal vertex.

7. The non-transitory computer readable medium of claim 6, wherein the goal vertex is processed first.

8. The non-transitory computer readable medium of claim 5, wherein the range bound for each of the selected one or more of the plurality of vertices is determined by combining the range bound for each descendant.

9. The non-transitory computer readable medium of claim 5, wherein the range bound for each of the selected one or more of the plurality of vertices includes a lower bound and an upper bound of path lengths from the each of the selected one or more of the plurality of vertices to a goal vertex.

10. The non-transitory computer readable medium of claim 5, wherein the selected one or more of the plurality of vertices are not processed.

11. The non-transitory computer readable medium of claim 5, wherein the selected one or more of the plurality of vertices are ready for processing when all successors of the selected one or more of the plurality of vertices are processed.

12. A non-transitory computer readable medium storing a program causing a computer to determine a target path for a model-based control system which employs target value searching, wherein the model-based control system includes a directed acyclic graph, wherein the directed acyclic graph includes a plurality of vertices interconnected by a plurality of edges, said determination of the target path comprising:
   (a) performing a depth-first search of the directed acyclic graph for the target path, wherein the depth-first search is operative to return an explicit solution or an implicit solution, wherein the implicit solution is determined using a heuristic;
   (b) constructing the target path from the implicit solution or the explicit solution, wherein the target value search is a heuristic target-value search that has a memory requirement linear in the target value.

13. The non-transitory computer readable medium of claim 12, further comprising the step of creating a pattern database.

14. The non-transitory computer readable medium of claim 12, wherein the heuristic uses a pattern database.

15. The non-transitory computer readable medium of claim 12, wherein said depth-first search includes a current search prefix and a lead vertex, wherein said current search prefix includes one or more connected vertices from the plurality of vertices, wherein said lead vertex is a deepest vertex in the current search prefix.

16. The non-transitory computer readable medium of claim 12, said depth-first search performing the steps of:
   (i) determining whether the current search prefix is an explicit solution; and,
   (ii) if it is determined that the current search prefix is an explicit solution, returning the current search prefix as the target path and ending the depth-first search.

17. The non-transitory computer readable medium of claim 12, said depth-first search performing the steps of:
   (i) determining whether the current search prefix is better than previous current search prefixes; and,
   (ii) if it is determined that the current search prefix is better than the previous current search prefixes, saving the current search prefix.

* * * * *